(12) United States Patent
Ganesan et al.

(10) Patent No.: US 12,526,034 B2
(45) Date of Patent: Jan. 13, 2026

(54) BEAM SWITCHING AFTER PERFORMING LISTEN-BEFORE-TALK

(71) Applicant: Lenovo (Singapore) PTE. LTD., New Tech Park (SG)

(72) Inventors: Karthikeyan Ganesan, Kronberg im Taunus (DE); Ankit Bhamri, Rödermark (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 470 days.

(21) Appl. No.: 17/910,321

(22) PCT Filed: Mar. 9, 2021

(86) PCT No.: PCT/IB2021/051966
§ 371 (c)(1),
(2) Date: Sep. 8, 2022

(87) PCT Pub. No.: WO2021/181282
PCT Pub. Date: Sep. 16, 2021

(65) Prior Publication Data
US 2023/0155659 A1   May 18, 2023

Related U.S. Application Data

(60) Provisional application No. 62/987,284, filed on Mar. 9, 2020.

(30) Foreign Application Priority Data

Jan. 29, 2021 (WO) .................. PCT/IB2021/050693

(51) Int. Cl.
*H04B 7/06* (2006.01)
*H04L 5/00* (2006.01)
(Continued)

(52) U.S. Cl.
CPC ..... *H04B 7/06968* (2023.05); *H04B 7/06964* (2023.05); *H04W 74/0808* (2013.01)

(58) Field of Classification Search
CPC .. H04B 7/0695; H04B 7/0623; H04B 7/0691; H04W 74/0808; H04W 88/02;
(Continued)

(56) References Cited

U.S. PATENT DOCUMENTS

2019/0230706 A1   7/2019  Li et al.
2019/0357252 A1*  11/2019  Sun ........................ H04W 72/23
(Continued)

FOREIGN PATENT DOCUMENTS

WO    2019173365 A1   9/2019
WO    2020033395 A1   2/2020

OTHER PUBLICATIONS

Panasonic, Discussion on resource allocation mechanism of mode 2 in NR V2X, 3GPP TSG RAN WG1 #97 R1-1906403, May 13-17, 2019, p. 1-3.
(Continued)

*Primary Examiner* — Jenee Holland
(74) *Attorney, Agent, or Firm* — Kunzler Bean & Adamson

(57) ABSTRACT

Apparatuses, methods, and systems are disclosed for beam switching after a Listen-Before-Talk ("LBT") procedure. One method includes performing the LBT procedure prior to a first occasion of configured-grant ("CG") resources; performing an uplink ("UL") transmission of a first transport block ("TB") during the first occasion and using a first beam in response to the performed LBT procedure; determining that no hybrid automatic repeat request acknowledgment ("HARQ-ACK") feedback is received within a duration of a timer; and switching to a second beam for subsequent UL transmissions of the first TB in response to the determining.

20 Claims, 8 Drawing Sheets

(51) Int. Cl.
*H04L 27/00* (2006.01)
*H04W 24/02* (2009.01)
*H04W 24/08* (2009.01)
*H04W 74/0808* (2024.01)
*H04W 88/02* (2009.01)

(58) Field of Classification Search
CPC .... H04W 24/08; H04W 24/02; H04L 5/0078; H04L 27/0006; H04L 5/0044; H04L 5/0025
See application file for complete search history.

(56) References Cited

U.S. PATENT DOCUMENTS

| | | | |
|---|---|---|---|
| 2020/0053637 A1 | 2/2020 | Tsai et al. | |
| 2020/0053670 A1 | 2/2020 | Jung et al. | |
| 2020/0053779 A1 | 2/2020 | Jeon et al. | |
| 2020/0177318 A1* | 6/2020 | Belleschi | H04W 72/53 |
| 2020/0259621 A1* | 8/2020 | Oh | H04L 1/1822 |
| 2021/0029730 A1* | 1/2021 | Lou | H04L 1/1812 |
| 2021/0029768 A1 | 1/2021 | Shih et al. | |
| 2021/0120583 A1* | 4/2021 | Wang | H04B 7/0626 |
| 2021/0266914 A1* | 8/2021 | Yoo | H04L 5/0025 |
| 2021/0410187 A1* | 12/2021 | Yang | H04W 16/28 |
| 2022/0377810 A1 | 11/2022 | Bhamri et al. | |
| 2022/0408488 A1* | 12/2022 | Deghel | H04W 74/0833 |
| 2023/0009559 A1* | 1/2023 | Wang | H04B 7/0695 |
| 2023/0141702 A1 | 5/2023 | Ganesan et al. | |

OTHER PUBLICATIONS

3GPP, 3rd Generation Partnership Project; Technical Specification Group Radio Access Network; NR; Physical layer procedures for data (Release 16), 3GPP TS 38.214 V16.0.0, Dec. 2019, p. 1-147.

3GPP, 3rd Generation Partnership Project; Technical Specification Group Radio Access Network; NR; User Equipment (UE) radio access capabilities (Release 15), 3GPP TS 38.306 V15.8.0, Dec. 2019, p. 1-60.

3GPP, 3rd Generation Partnership Project; Technical Specification Group Radio Access Network; NR; Medium Access Control (MAC) protocol specification (Release 15), 3GPP TS 38.321 V15.8.0, Dec. 2019, p. 1-78.

3GPP, 3rd Generation Partnership Project; Technical Specification Group Radio Access Network; NR; Radio Resource Control (RRC) protocol specification (Release 15), 3GPP TS 38.331 V15.8.0, Dec. 2019, p. 1-532.

InterDigital, "Handling UL LBT Failures in MAC", 3GPP RAN WG2 Meeting #106 R2-1906403, May 13-17, 2019, pp. 1-3.

Vivo, "Potential solutions and techniques for NR unlicensed spectrum", 3GPP TSG RAN WG1 Meeting #92 R1-1801557, Feb. 26-Mar. 2, 2018, pp. 1-6.

Intel Corporation, "New SID: Study on supporting NR from 52.6GHz to 71 GHz", 3GPP TSG RAN Meeting #86 RP-193259, Dec. 9-12, 2019, pp. 1-3.

PCT/IB2021/050693, "Notification of Transmittal of the International Search Report and the Written Opinion of the International Searching Authority, or the Declaration", International Searching Authority, Apr. 28, 2021, pp. 1-15.

PCT/IB2021/052461, "Notification of Transmittal of the International Search Report and the Written Opinion of the International Searching Authority, or the Declaration", International Searching Authority, Jun. 29, 2021, pp. 1-15.

Intel Corp., "Enhancements to NR DL signals and channels for unlicensed operation", 3GPP TSG RAN WG1 Meeting #95 R1-1812480, Nov. 12-16, 2018, pp. 1-12.

ZTE et al., "Considerations on initial access signals and channels for NR-U", c3GPP TSG RAN WG1 Meeting #97 R1-1905948, May 13-17, 2019, pp. 1-15.

3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.2.0, Dec. 2019, pp. 1-310.

3GPP, "3rd Generation Partnership Project; Technical Specification Group Radio Access Network; NR; User Equipment (UE) radio transmission and reception; Part 2: Range 2 Standalone (Release 16)", 3GPP TS 38.101-2 V16.2.0, Dec. 2019, pp. 1-157.

3GPP, "3rd Generation Partnership Project; Technical Specification Group Radio Access Network; NR; Base Station (BS) radio transmission and reception (Release 16)", 3GPP TS 38.104 V16.2.0, Dec. 2019, pp. 1-239.

3GPP, "3rd Generation Partnership Project; Technical Specification Group Radio Access Network; NR; Physical channels and modulation (Release 16)", 3GPP TS 38.211 V16.0.0, Dec. 2019, pp. 1-129.

3GPP, "3rd Generation Partnership Project; Technical Specification Group Radio Access Network; NR; Multiplexing and channel coding (Release 15)", 3GPP TS 38.212 V15.8.0, Dec. 2019, pp. 1-101.

U.S. Appl. No. 17/914,724, "Office Action Summary", US Patent and Trademark Office, Dec. 16, 2024, pp. 1-30.

* cited by examiner

BEAM SWITCHING AFTER PERFORMING LISTEN-BEFORE-TALK

CROSS-REFERENCE TO RELATED APPLICATIONS

This application claims priority to U.S. Provisional Patent Application No. 62/987,284 entitled "DIRECTIONAL LISTEN-BEFORE-TALK PROCEDURE" and filed on Mar. 9, 2020 for Karthikeyan Ganesan, Ankit Bhamri, and Ali Ramadan Ali, which application is incorporated herein by reference. This application also claims priority to International Patent Application PCT/IB2021/050693 entitled "PERFORMING A LISTEN-BEFORE-TALK ON BEAMS AND/OR PANELS" and filed on Jan. 29, 2021 for Ankit Bhamri, Ali Ramadan Ali, Alexander Johann Maria Golitschek Edler von Elbwart, Karthikeyan Ganesan, and Joachim Löhr, which application claims priority to U.S. Provisional Patent Application No. 62/967,269 entitled "APPARATUSES, METHODS, AND SYSTEMS FOR FAST DIRECTIONAL LBT AT UE IN CONNECTED MODE" and filed on Jan. 29, 2020 for Ankit Bhamri, Ali Ramadan Ali, Alexander Johann Maria Golitschek Edler von Elbwart, Karthikeyan Ganesan, and Joachim Loehr, which applications are incorporated herein by reference.

FIELD

The subject matter disclosed herein relates generally to wireless communications and more particularly relates to directional listen-before-talk ("LBT") procedures, especially for autonomous uplink communications using unlicensed spectrum.

BACKGROUND

In certain wireless communication systems, service is supplemented by operation on unlicensed spectrum. However, operation on unlicensed spectrum requires Clear Channel Assessment ("CCA") prior to transmission, for example involving a LBT procedure.

In NR-U, channel access in both downlink and uplink relies on the CCA (e.g., LBT procedure) to gain channel access. Prior to any transmission, the gNB and/or UE must first sense the channel to find out whether there are ongoing communications on the channel No beamforming is considered for LBT in NR-U in Rel. 16 and only omni-directional LBT is assumed.

BRIEF SUMMARY

Disclosed are procedures for beam switching after LBT procedure. Said procedures may be implemented by apparatus, systems, methods, or computer program products.

One method of a User Equipment device ("UE") includes performing a Listen-Before-Talk ("LBT") procedure prior to a first occasion of configured-grant ("CG") resources and performing uplink ("UL") transmission of a first transport block ("TB") during the first occasion and using a first beam in response to successful LBT. The method includes starting a timer in response to the UL transmission, determining that failure of the UL transmission has occurred if no Hybrid Automatic Repeat Request ("HARQ") Acknowledgement ("ACK") feedback is received within the duration of timer, and switching to a second beam for subsequent UL transmission of the first TB in response to determining that failure of the UL transmission has occurred.

Another method of a UE includes performing a first LBT procedure using omni-directional sensing to acquire a first Channel Occupancy Time ("COT") and performing a first UL transmission of a first TB during the first COT and using a first beam in response to successful LBT, wherein the first UL transmission uses a first portion of the first COT. The second method includes performing a directional LBT procedure for a second beam to acquire a remaining portion of the first COT.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
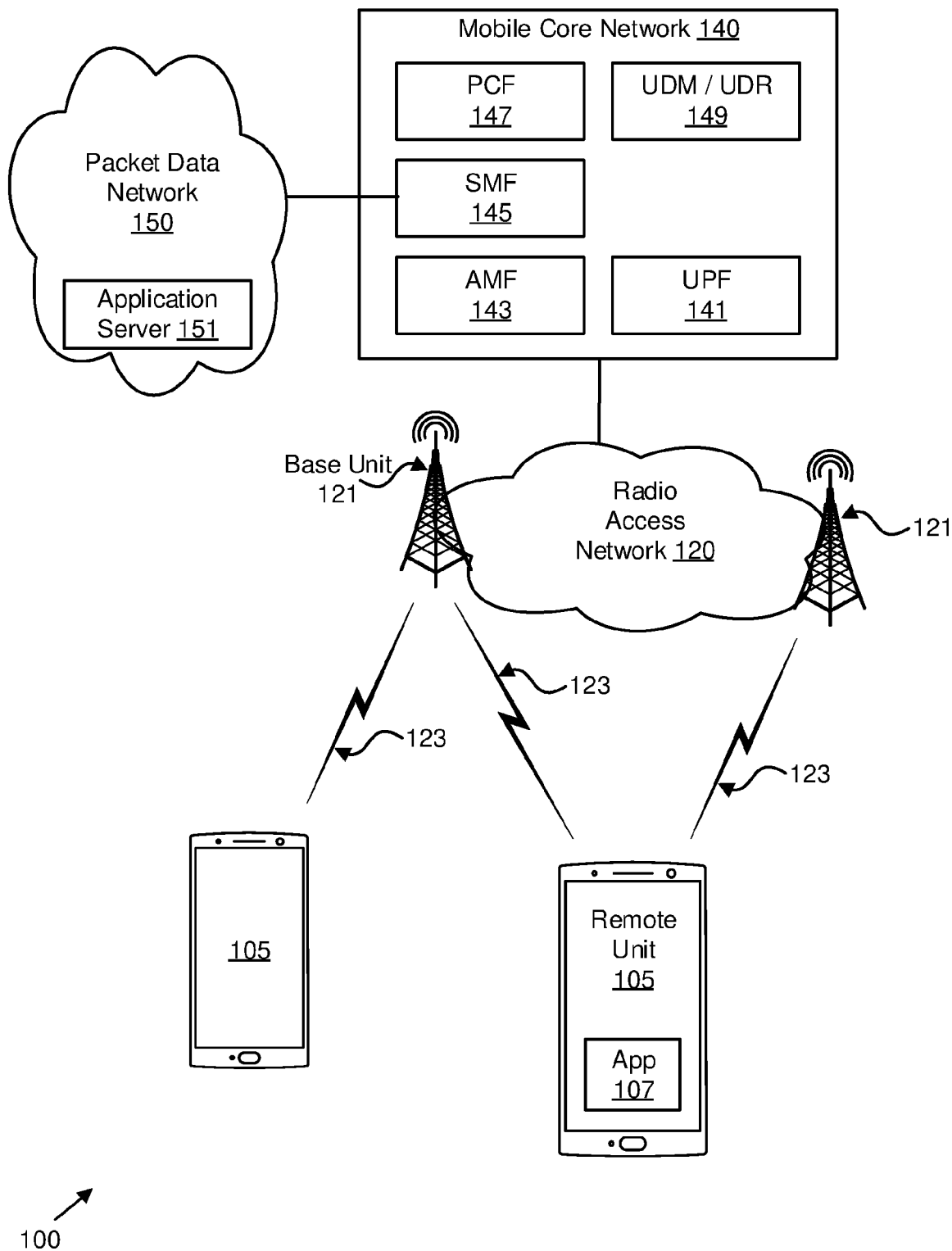
FIG. 1 is a schematic block diagram illustrating one embodiment of a wireless communication system for beam switching after LBT procedure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for beam switching after LBT procedure. The present disclosure deals with the channel access mechanism in unlicensed band for high frequency range (namely FR2 or FR4), but not limited to that. More specifically, as beam-based operation is assumed for unlicensed spectrum in FR2 and beyond, it is crucial to perform listen-before-talk ("LBT") in a specific beam direction(s) rather than omni-directional LBT.

The present disclosure describes panel switching during LBT failures at the UE side in connected mode and provide solutions to on how to allow faster channel access for AUL by switching beam/panel based LBT failures at the UE in connected state also considering interference/LBT failures at gNB side. Basically, if there is an LBT failure at UE in specific panel/beam direction, then how to facilitate the UE to autonomously switch to from one panel/beam to another for performing faster LBT. Alternatively, how to allow parallel LBT using multiple panels at the same time for AUL.

In NR-U, channel access in both downlink and uplink relies on the LBT; however, no beamforming is considered for LBT in NR-U in Rel. 16 and only omni-directional LBT is assumed. The NR-U LBT procedures for channel access can be summarized as follows:

Both gNB-initiated and UE-initiated COTs use Category 4 ("Cat-4") LBT where the start of a new transmission burst always perform LBT with exponential back-off. Only with exception, when the DRS must be at most one ms in duration and is not multiplexed with unicast PDSCH. As used herein, a Cat-4 LBT procedure refers to LBT with a random back-off and with a variable size contention window.

UL transmission within a gNB initiated COT or a subsequent DL transmission within a UE or gNB initiated COT can transmit immediately without sensing only if the gap from the end of the previous transmission is not more than 16 is, otherwise Category 2 ("Cat-2") LBT must be used and the gap cannot exceed 25 µs. As used herein, a Cat-2 LBT procedure refers to LBT without random back-off.

In various embodiments, a UE may include multiple antenna panels. An identifier (ID) that can be used at least for indicating panel-specific UL transmission is supported. The ID may be defined considering the possibility to reuse/modification of Rel-15 specification support or introducing new ID. In certain embodiments, the UE is not required to explicitly disclose its UL antenna panel implementation. In other embodiments, UE capability signaling may be used for panel-specific UL transmission.

A panel identifier (panel ID) to be used at least for indicating panel-specific UL transmission may include one of the following: 1) an SRS resource set ID; 2) an ID, which is directly associated to a reference RS resource and/or resource set; 3) an ID, which can be assigned for a target RS resource or resource set; and 4) an ID which is additionally configured in spatial relation information. The panel ID (not excluding to reuse existing ID) may be used for panel-selection-based transmission of PUSCH, PUCCH and SRS, among multiple activated panels.

In some embodiments, multiple panels are implemented on a UE and only one panel can be activated at a time, with a predetermined panel switching/activation delay. In some embodiments, multiple panels are implemented on a UE and multiple panels can be activated at a time and one or more panels can be used for transmission. In some embodiments, multiple panels are implemented on a UE and multiple panels can be activated at a time but only one panel can be used for transmission. Note that this does not require a UE to always activate multi-panels simultaneously. Also note that the UE can control the panel activation/deactivation.

In other embodiments, a new panel-ID may be used, which can be implicitly/explicitly applied to the transmission for a target RS resource or resource set, for PUCCH resource, for SRS resource. In such embodiments, a panel specific signaling is performed using the new panel-ID implicitly (e.g., by DL beam reporting enhancement) or explicitly. If explicitly signaled, the ID can be configured in the target RS/channel or reference RS (e.g., in the DL RS resource configuration or in spatial relation info).

As used herein, a "UE panel" refers to a logical entity that may be mapped to physical UE antennas. For certain condition(s), the gNB can assume the mapping between the UE's physical antennas to the logical entity "UE panel" activated for transmission will not be changed. Depending on the UE's own implementation, a "UE panel" can have at least the following functionality as an operational role of Unit of antenna group to control its Tx beam independently.

A first problem addressed by the present disclosure relates to how to handle UL Tx failure during multi-panel operation with spatial LBT. The disclosure provides several solutions involving on panel switching during LBT failures at the UE side in connected mode and provide solutions to on how to allow faster channel access for autonomous uplink ("AUL") transmission by switching beam/panel based LBT failures at the UE in connected state also considering interference/LBT failures at gNB side.

The disclosure provides solutions for how to facilitate the UE to autonomously switch to from one panel/beam to another for performing faster LBT if there is an LBT failure at UE in specific panel/beam direction. The disclosure provides solutions for how to allow parallel LBT using multiple panels at the same time for AUL.

A second problem addressed by the present disclosure relates to UE-initiated beam/panel switching during the same Channel Occupancy Time ("COT"). The disclosure provides solutions for how to acquire a remaining portion of the COT during multi-panel operation with spatial LBT.

FIG. 1 depicts a wireless communication system 100 for beam switching after LBT procedure, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the RAN 120 may send a measurement and reporting configuration 111 to the remote unit 105, wherein the remote unit 105 sends a measurement report 113 to the RAN 120.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. In various embodiments, the mobile core network 140 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

While FIG. 1 depicts components of a 5G RAN and a 5G core network, the described embodiments for beam switching after LBT procedure apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

The remote unit 105 is configured with multiple UE panels either during initial access or in the connected mode using SRI. As used herein, a "UE panel" refers to a logical entity that may be mapped to physical UE antennas. For certain condition(s), the gNB can assume the mapping between UE's physical antennas to the logical entity "UE panel" activated for transmission will not be changed. Depending on the remote unit 105 implementation, a "UE panel" can have at least the functionality as an operational role of Unit of antenna group to control its Tx beam independently.

According to a first solution, the remote unit 105 handles UL Tx failure by switching to a different panel/beam and using the same configured grant resources.

According to a second solution, the remote unit 105 handles UL Tx failure by switching to a different panel/beam, where the different panels/beams have different configured grant resources.

According to a third solution, the remote unit 105 handles UL Tx failure by performing LBT on multiple panels/beams and selecting only one panel/beam for UL transmission. Here, the multiple panels/beams use the same configured grant resources.

According to a third solution, the remote unit 105 handles UL Tx failure by performing LBT on multiple panels/beams and selecting only one panel/beam for UL transmission. Here, the multiple panels/beams use different configured grant resources. Moreover, the remote unit 105 selects multiple panels/beams for UL transmission.

According to a second solution, the remote unit 105 handles UL Tx failure by switching to a different panel/beam, where the different panels/beams have different configured grant resources.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting measurement reporting in non-public networks.

Figure 2:
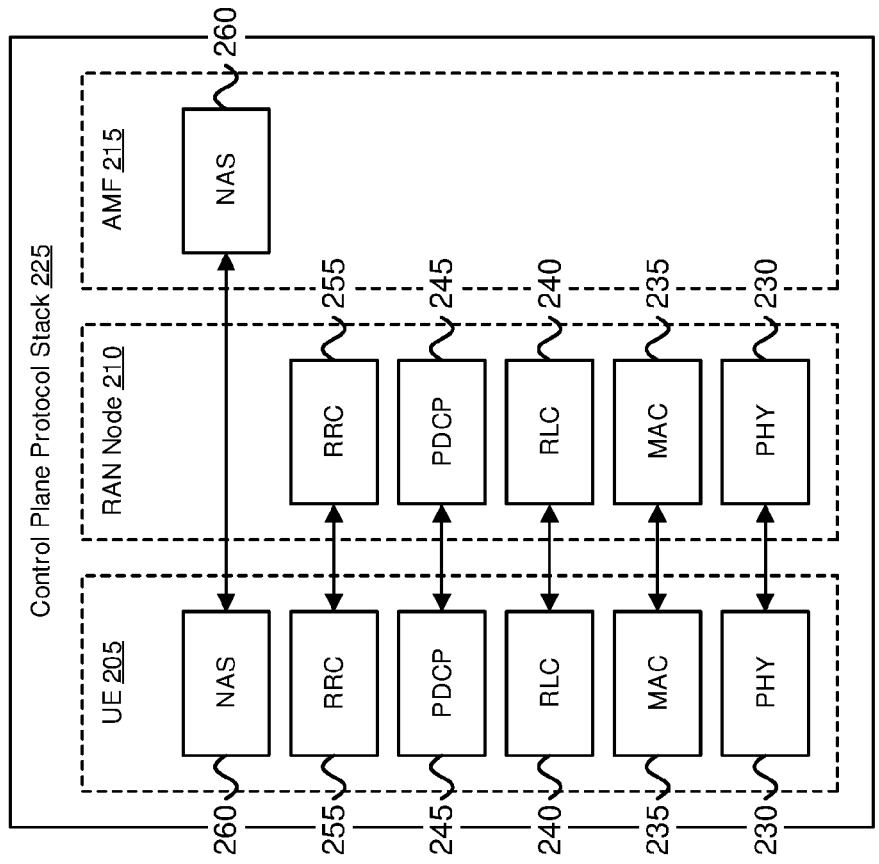
FIG. 2 is a block diagram illustrating one embodiment of a 5G New Radio ("NR") protocol stack.
Figure 2:
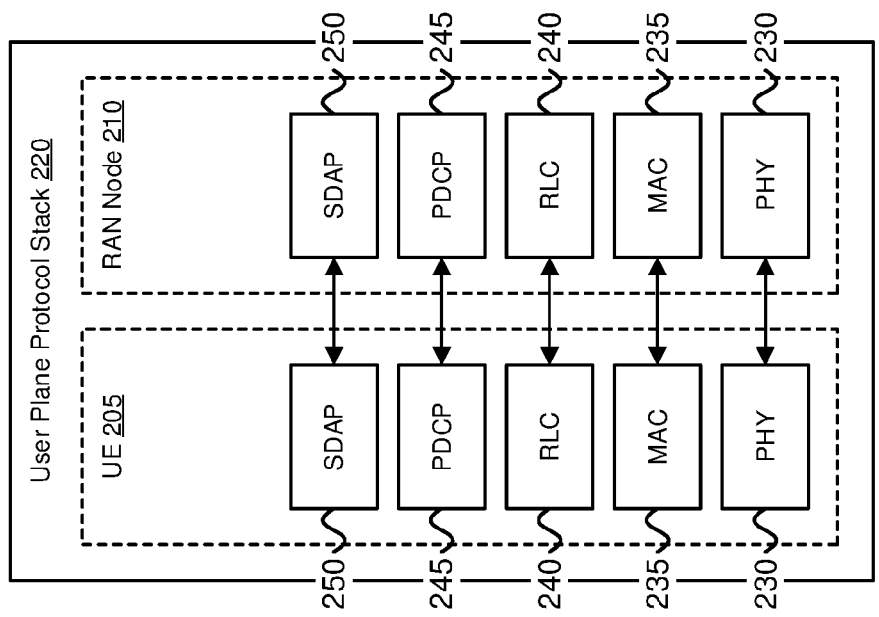

FIG. 2 depicts a NR protocol stack 200, according to embodiments of the disclosure. While FIG. 2 shows a UE 205, a RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 220 and a Control Plane protocol stack 225. The User Plane protocol stack 220 includes a physical ("PHY") layer 230, a Medium Access Control ("MAC") sublayer 235, the Radio Link Control ("RLC") sublayer 240, a Packet Data Convergence Protocol ("PDCP") sublayer 245, and Service Data Adaptation Protocol ("SDAP") layer 250. The Control Plane protocol stack 225 includes a physical layer 230, a MAC sublayer 235, a RLC sublayer 240, and a PDCP sublayer 245. The Control Plane protocol stack 225 also includes a Radio Resource Control ("RRC") layer 255 and a Non-Access Stratum ("NAS") layer 260.

The AS layer (also referred to as "AS protocol stack") for the User Plane protocol stack 220 consists of at least SDAP, PDCP, RLC and MAC sublayers, and the physical layer. The AS layer for the Control Plane protocol stack 225 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 255 and the NAS layer 260 for the control plane and includes, e.g., an Internet Protocol ("IP") layer or PDU Layer (not depicted) for the user plane. L1 and L2 are referred to as "lower layers," while L3 and above (e.g., transport layer, application layer) are referred to as "higher layers" or "upper layers."

The physical layer 230 offers transport channels to the MAC sublayer 235. The physical layer 230 may perform CCA/LBT procedure as described herein. In certain embodiments, the physical layer 230 may send a notification of UL LBT failure to a MAC entity at the MAC sublayer 235. The MAC sublayer 235 offers logical channels to the RLC sublayer 240. The RLC sublayer 240 offers RLC channels to the PDCP sublayer 245. The PDCP sublayer 245 offers radio bearers to the SDAP sublayer 250 and/or RRC layer 255. The SDAP sublayer 250 offers QoS flows to the core network (e.g., 5GC). The RRC layer 255 provides for the addition, modification, and release of Carrier Aggregation and/or Dual Connectivity. The RRC layer 255 also manages the establishment, configuration, maintenance, and release of Signaling Radio Bearers ("SRBs") and Data Radio Bearers ("DRBs").

The NAS layer 260 is between the UE 205 and the 5GC 215. NAS messages are passed transparently through the RAN. The NAS layer 260 is used to manage the establishment of communication sessions and for maintaining continuous communications with the UE 205 as it moves between different cells of the RAN. In contrast, the AS layer is between the UE 205 and the RAN carries information over the wireless portion of the network.

Figure 3:
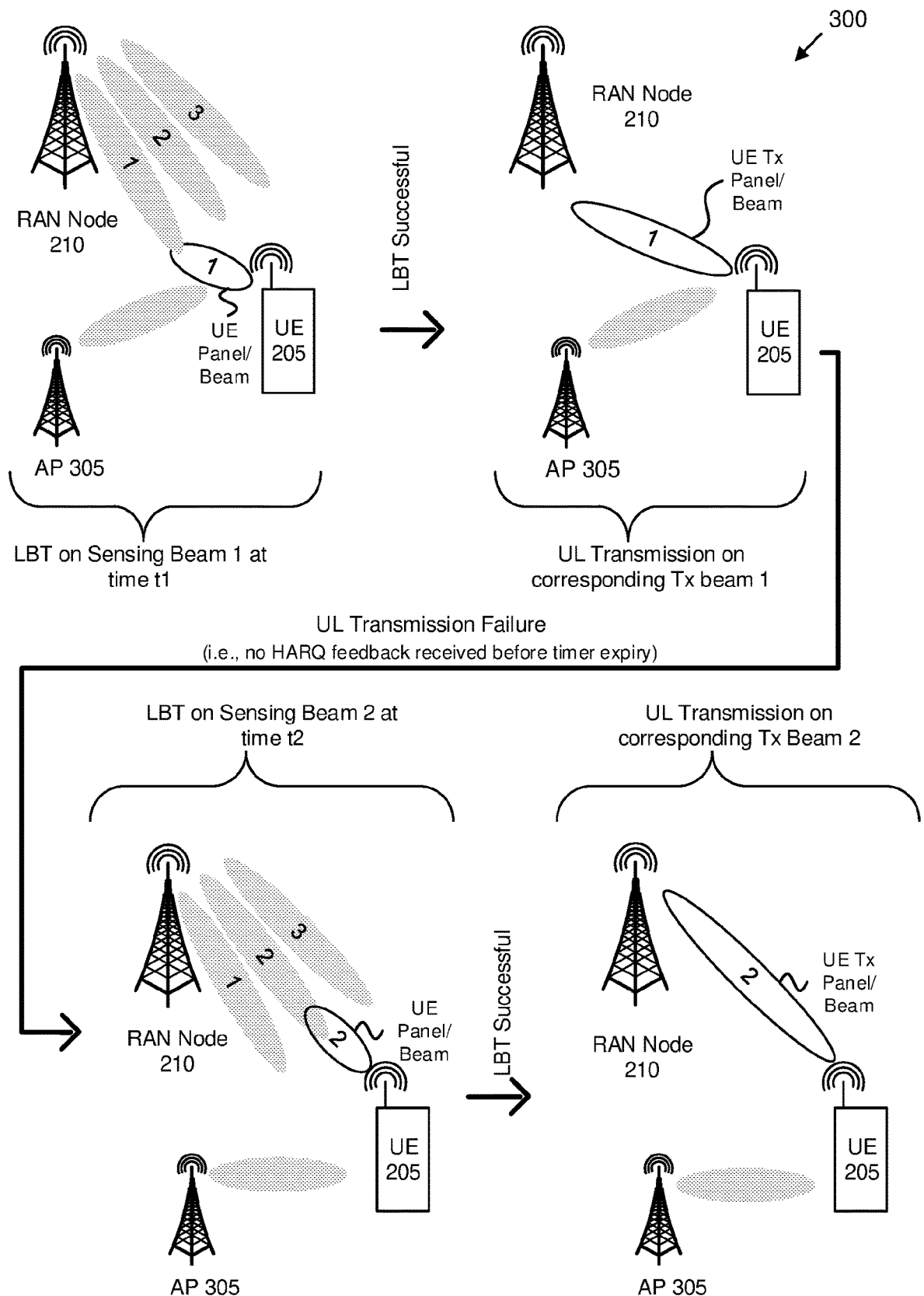
FIG. 3 is a diagram illustrating one embodiment of directional LBT prior to UL transmission.

FIG. 3 depicts a scenario 300 for directional LBT, according to embodiments of the disclosure. The scenario 300 may involve a UE 205, a RAN node 210 with which the UE 205 desires to send a UL transmission, and an access point ("AP") 305 which is representative of a potential user of the same communication frequencies as the UE 205 and RAN node 210. The UE 205 may be one implementation of the remote unit 105 and the RAN node 210 may be one implementation of the base unit 121. The UE 205 has generated a UL TB for transmission to the RAN node 210 and thus performs performing a LBT procedure for a configured set of Tx panels/beams corresponding to the UL transmission.

As depicted, the UE 205 performs an LBT procedure on at least beam #1 at time 't1,' i.e., in preparation for UL transmission using CG resources. Note that the LBT procedure determines whether the RAN node 210, the AP 305, or another device is using the channel (i.e., radio frequencies) that the UE 205 is to use for the UL transmission. Here, it is assumed that beam #1 is a sensing beam that corresponds to a first UE panel and that the UE 205 supports multiple panels. As depicted, LBT is successful for sensing Beam #1. Where the LBT procedure includes assessing multiple beams, here is it assumed that a Tx beam and/or UE panel corresponding to the sensing Beam #1 is selected.

The UE 205 performs UL transmission on CG resources using Tx Beam #1 and begins a UL failure timer. However, there is uplink transmission failure and thus the RAN node 210 either does not receive the UL transmission or is unable to decode the UL transmission. Because the UE does not receive a HARQ-ACK from the RAN node 210 before expiry of the failure timer, the UE determines that the UL transmission failed. As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In response to determining UL Tx failure for Tx Beam #1, the UE 205 switches to a second sensing beam/UE panel and performs LBT on at least beam #2 at time 't2,' i.e., in preparation for UL transmission using a second occasion of CG resources. Here, it is assumed that LBT is successful for the sensing panel/beam #2. Thus, the UE 205 performs UL transmission on the corresponding Tx panel/beam #2. However, if LBT fails for Rx panel/beam #2, then the UE 205 continues performing a LBT procedure for the configured set of Tx panels/beams until LBT success or until LBT fails for all configured panels/beams.

Figure 4:
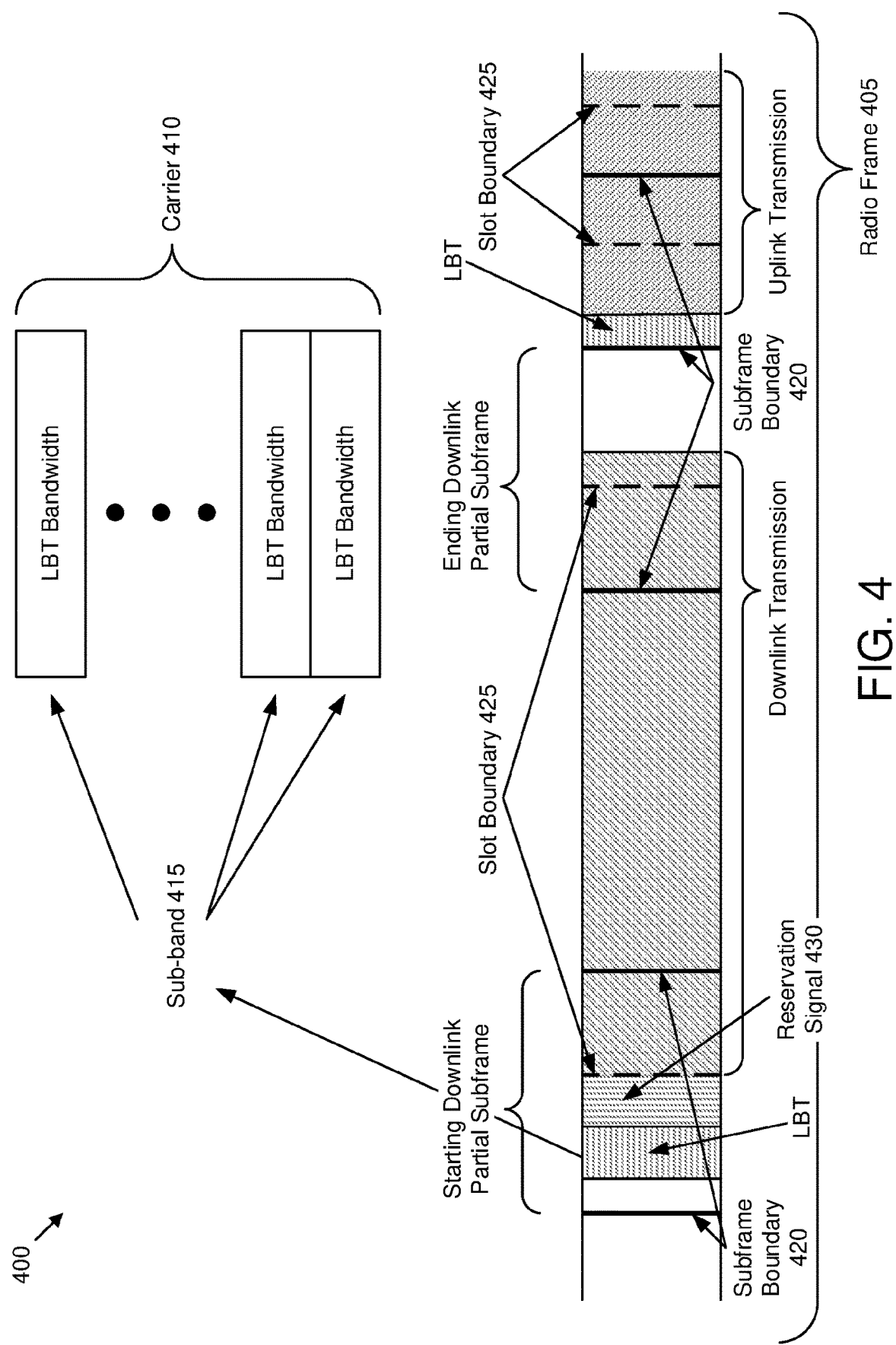
FIG. 4 is a diagram illustrating one embodiment of a radio frame during which LBT procedure is performed.

FIG. 4 depicts an LBT procedure 400 for a radio frame 405 for unlicensed communication, according to embodiments of the disclosure. When a communication channel is a wide bandwidth unlicensed carrier 410 (e.g., several hundred MHz), the CCA/LBT procedure relies on detecting the energy level on multiple sub-bands 415 of the communications channel as shown in FIG. 4. The LBT parameters (such as type/duration, clear channel assessment parameters, etc.) are configured in the UE 205 by the RAN node 210. In one embodiment, the LBT procedure is performed at the PHY layer 230.

FIG. 4 also depicts frame structure of the radio frame 405 for unlicensed communication between the UE 205 and RAN node 210. The radio frame 405 may be divided into subframes (indicated by subframe boundaries 420) and may be further divided into slots (indicated by slot boundaries 425). The radio frame 405 uses a flexible arrangements where uplink and downlink operations are on the same frequency channel but are separated in time. However, the subframes are not configured as a downlink subframe or an uplink subframe and a particular subframe may be used by either the UE 205 or RAN node 210. As discussed previously, LBT is performed prior to a transmission. Where LBT does not coincide with a slot boundary 425, a reservation signal 430 may be transmitted to reserve the channel until the slot boundary is reached and data transmission begins.

As discussed above, according to a first solution the UE 205 is configured with the same CG resource for different panels/beams. When the UE 205 performs CCA/LBT in one of the configured sensing beams and transmits a TB in one of the configured Tx beams after the success of LBT, the UE 205 initiates (i.e., starts) a timer. The UE 205 detects (i.e., declares) UL Tx failure if it does not receive HARQ feedback within a specified time, e.g., at the expiry of the timer. In one embodiment, this timer is the CG retransmission timer. In another embodiment, this timer is a new timer introduced for the purpose of detecting UL Tx failure.

Note that the CG retransmission timer is implicitly associated with the decoding failure at the RAN node due to interference or channel condition or short LBT failure at the transmission of the RAN node. However, in another implementation of the first solution, a new timer—different than the CG retransmission timer—is introduced which may be an LBT/CCA specific timer that can be associated with a certain channel access priority class. Regardless of implementation, the timer is started after the transmission of the TB in the uplink and stops after receiving corresponding HARQ feedback. Additionally, expiry of the timer triggers autonomous panel/beam switching, as discussed below.

As used herein, UE autonomous behavior refers to a UE-initiated behavior, where the UE performs the behavior in response to an internal trigger and without waiting for (and receiving) instructions from the network (e.g., RAN and/or CN). Thus, the UE 205 autonomously switching to a different panel/beam refers to a UE-initiated switch to a different panel/beam, wherein the UE 205 performs with switch without receiving instructions from the network to switch the panel/beam.

Upon detecting (i.e., determining) UL Tx failure, the UE 205 is allowed to autonomously switch to a different panel/beam to perform CCA/LBT for the (re)-transmission of the same TB in the same CG resource. In one embodiment, the UE 205 autonomously switches to a different sensing beam—from among the configured sensing beams—for performing CCA/LBT. In another embodiment, the UE 205 autonomously switches to a different Tx beam—from among the configured Tx beams—for retransmitting the TB.

In embodiments of the first solution, the RAN node 210 (e.g., gNB) reports the HARQ feedback with the same spatial filter used for the CG transmission. Aperiodic Uplink Control Information ("A-UCI") indicates the panel/beam ID used by the UE 205 in the CG resource. Here, the UE 205 may choose the first panel for LBT-UL transmission from a set of configured panels/beams based on the DL channel signal strength, where the selection may be based on the measurement on SSB, CSI-RS, etc.

According to the second solution, the UE 205 is configured with different CG resource for different panels/beams. As in the first solution, the UE 205 performs CCA/LBT for each TX panel/beam and transmits a TB after the success of LBT. If the UE 205 does not receive HARQ feedback within a specified time period (i.e., at the expiry of the CG retransmission timer or the new LBT/CCA specific timer, discussed above), then the UE 205 declares UL Tx failure.

Again, the RAN node 210 reports the HARQ feedback with the same spatial filter used for the CG transmission, A-UCI indicates the panel/beam ID used by the UE in the CG resource. Upon detecting/declaring UL Tx failure, the UE 205 may autonomously switch to a different panel/beam to perform CCA/LBT for the transmission of same TB in the different CG resources. However, in the second solution each CG resource is associated with a TX panel/beam of the UE 205.

In one embodiment of the second solution, the UE 205 starts the CG retransmission timer after transmission of the TB and declares UL Tx failure upon expiry of the CG retransmission timer. As described above, the CG retransmission timer may be used is implicitly associated with the decoding failure at the RAN node due to interference or channel condition or short LBT failure at the transmission of the RAN node.

In another embodiment of the second solution, the UE 205 starts a new timer-different than the CG retransmission timer—after transmission of the TB and declares UL Tx failure upon expiry of the CG retransmission timer. As described above, the new timer may be an LBT/CCA specific timer that can be associated with a certain channel access priority class. Alternatively, the new timer may be a CG-specific timer. Regardless of implementation, the timer is started after the transmission of the TB in the uplink and stops after receiving corresponding HARQ feedback. Expiry of the timer triggers autonomous panel/beam switching.

According to the second solution, the UE 205 may choose the first panel for LBT-UL transmission from the set of panels/beams based on the DL channel signal strength. Here, the selection may be based on the measurement on SSB, CSI-RS, etc. The UE 205 then chooses the CG resource which has same TBS for the retransmission. Alternatively, the UE 205 may first choose the CG resource which has same TBS and then choose the UE panel for UL transmission. The UE 205 may choose to use the same HARQ process for transmitting in different CG resource as long as the TBS is same.

According to the third solution, the UE 205 may be configured with the same CG resources for multiple panels/beams. Moreover, the UE 205 performs LBT on a plurality of panels/beams, where only one panel/beam is selected for UL transmission.

The UE 205 performs first LBT/CCA with one panel/beam and transmit a TB after the successful LBT/CCA procedure. Then, after the expiry of the CG retransmission timer (or the new LBT/CCA specific timer introduced above) without receiving HARQ-ACK, the UE 205 performs second LBT with another set of panels/beams on the same CG resource. In some embodiments, the second LBT may be performed using plurality of panels/beams simultaneously on the same CG resource. After the successful completion of LBT/CCA procedure, the UE 205 performs UL transmission on panel/beam based on LBT-ED, i.e., where ED is compared for different panels/beams and a panel/beam is selected based on the least ED value.

In another implementation, the first LBT may be performed on one panel/beam and when it fails, then the second LBT may be performed on two panels/beams simultaneously from the configured set of panels/beams and when it fails, then the third LBT may be performed on three panels/beams simultaneously from the configured set of panels/beams, and so on.

According to the fourth solution, the UE 205 may be configured with different CG resources for the different panels/beams. The UE 205 performs LBT on a plurality of panels/beams. Moreover, the UE may select a plurality of panels/beams for UL transmission on different CG resources.

The UE 205 may perform LBT/CCA simultaneously on configured set of panels/beams simultaneously and same TB is repeated across different CG resources after the success of the LBT. Here, CG resources are assigned to each TX panel/beam separately. The RAN node provides HARQ feedback in the same spatial filter that is used for receiving the CG resources. The UE 205 stops the retransmission of the initial transmission in all CG resources after it receives at least one HARQ-ACK feedback and also flushes the HARQ buffer of all HARQ process. In one implementation, HARQ feedback may be transmitted from one or plurality of panels from the RAN node after short LBT.

The above strategies for handling directional LBT and UL failure can be extended to other channels used in the wireless communication system.

According to a fifth solution, the UE 205 may perform RACH preamble transmission using another panel/beam when LBT fails for a first panel/beam. When the UE 205 fails to transmit a RACH preamble from the panel associated with the highest DL signal reception quality of SSB due to LBT failure, then the UE 205 may autonomously switch to another panel/beam for the RACH preamble transmission.

Here, the UE 205 may choose the panel/beam chosen based on the next best DL signal reception quality of SSB. In certain embodiments, the UE 205 does not increment the preamble transmission counter and preamble ramping counters when autonomously switching to another panel/beam for the RACH preamble transmission In an alternate implementation, CCA/LBT may be performed simultaneously using plurality of panels/beams and RACH preamble transmission is performed only using one panel/beam where the panel/beam is chosen for RACH preamble transmission based on the DL signal strength reception quality. In another implementation, the RACH preamble transmission+MsgA is performed on plurality of panels after the CCA/LBT success using where MsgA (i.e., the first message of a 2-step random access procedure) contains the UE identity and panel ID/beam ID and the RAN node 210 may transmit only one RAR based on the reception quality of the RACH preamble.

According to a sixth solution, the UE 205 performs CCA for omni-directional transmissions and performs short LBT for directional transmissions. Here, the UE 205 may perform "first LBT" for, e.g., CAT-4 LBT like counter-based access with exponential back off in an omni-directional manner and it successfully or fails (both cases) to acquire the channel or want to switch to other panel/beam for directional transmission. Then, UE 205 may perform "second LBT" using a CAT-2 LBT type using shorter LBT like energy sensing either for 25 μs or 16 μs. The sixth solution is applicable to data channel, control channel, RACH/SRS transmission. In another implementation of the sixth solution, the second LBT may also be performed simultaneously using a plurality of panels/beams.

According to a seventh solution, the group-common Downlink Control Information ("DCI") from the RAN node 210 (e.g., gNB) indicates plurality of panels/beams where the CCA/LBT is successful as part of DL COT sharing information. Here, the RAN node 210 may indicate in DCI a plurality of panels/beams information in the "from panel/beam ID" element or "CSI-RS configuration" element or "SSB configuration" element or in the form of Transmission Configuration Indicator ("TCI") states or QCL-Type D, where the CCA/LBT are successfully performed for the DL initiated COT sharing. In such case, a COT sharing field in the DCI contains plurality of COT sharing indicator each represented by a TCI state or a QCL-Type D relationship with one or more transmission beam(s) configured semi-statically. The UE 205, after receiving this DCI information containing DL COT sharing indicator, may then choose to perform CCA/LBT in any of the indicated beam/panel or all simultaneously using shorter LBT (e.g., CAT-2 LBT type) for UL transmission. The UL transmission could be performed using one or plurality of beam/panels which could be further scheduled by the DCI or by autonomous uplink in the configured CG resource as explained in the previous embodiments.

Regarding Quasi-Co-Location ("QCL") assumptions, in certain embodiments the UE 205 is configured with a list of up to M TCI-State configurations within the higher layer parameter PDSCH-Config to decode PDSCH according to a detected PDCCH with DCI intended for the UE and the given serving cell, where the value of M depends on the UE capability maxNumberConfiguredTCIstatesPerCC.

Each TCI-State configuration contains parameters for configuring a QCL relationship between one or two downlink reference signals and the DM-RS ports of the PDSCH, the DM-RS port of PDCCH or the CSI-RS port(s) of a CSI-RS resource. The QCL relationship is configured by the higher layer parameter 'qcl-Type1' for the first DL RS, and the higher layer parameter 'qcl-Type2' for the second DL RS (if configured). For the case of two DL RSs, the QCL types are not the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

In some embodiments, the UE 205 receives an activation command used to map up to eight TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of Component Carriers ("CCs") is determined by indicated CC in the activation command, the same set of TCI state IDs are applied for all DL BWPs in the indicated CCs.

When a UE 205 supports two TCI states in a codepoint of the DCI field 'Transmission Configuration Indication' the UE 205 may receive an activation command, then the activation command is used to map up to eight combinations of one or two TCI states to the codepoints of the DCI field 'Transmission Configuration Indication'.

When the UE 205 is to transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $n+3N_{slot}^{subframe,\mu}$ where $\mu$ is the SCS configuration for the PUCCH. If parameter tci-PresentInDCI is set to "enabled" or tci-PresentInDCI-ForFormat1_2 is configured for the Control Resource Set ("CORESET") scheduling the PDSCH, and the time offset between the reception of the DL DCI and the corresponding PDSCH is equal to or greater than timeDurationForQCL if applicable, after a UE 205 receives an initial higher layer configuration of TCI states and before reception of the activation command, the UE 205 may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

If a UE 205 is configured with the higher layer parameter tci-PresentInDCI that is set as 'enabled' for the CORESET scheduling the PDSCH, the UE 205 assumes that the TCI field is present in the DCI format 1_1 of the PDCCH transmitted on the CORESET. If a UE is configured with the higher layer parameter tci-PresentInDCI-ForFormat1_2 for the CORESET scheduling the PDSCH, the UE assumes that the TCI field with a DCI field size indicated by tci-PresentInDCI-ForFormat1_2 is present in the DCI format 1_2 of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL if applicable, where the threshold is based on reported UE capability for determining PDSCH antenna port quasi co-location, the UE 205 assumes that the TCI state or the QCL assumption for the PDSCH is identical to the TCI state or QCL assumption whichever is applied for the CORESET used for the PDCCH transmission.

If the PDSCH is scheduled by a DCI format having the TCI field present, the TCI field in DCI in the scheduling component carrier points to the activated TCI states in the scheduled component carrier or DL BWP, the UE 205 is to use the TCI-State according to the value of the 'Transmission Configuration Indication' field in the detected PDCCH with DCI for determining PDSCH antenna port quasi co-location. The UE 205 may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability.

When the UE 205 is configured with a single slot PDSCH, the indicated TCI state should be based on the activated TCI states in the slot with the scheduled PDSCH. When the UE 205 is configured with a multi-slot PDSCH, the indicated TCI state should be based on the activated TCI states in the first slot with the scheduled PDSCH, and UE 205 is to expect the activated TCI states are the same across the slots with the scheduled PDSCH.

Independent of the configuration of tci-PresentInDCI and tci-PresentInDCI-ForFormat1_2 in RRC connected mode, if all the TCI codepoints are mapped to a single TCI state and the offset between the reception of the DL DCI and the corresponding PDSCH is less than the threshold timeDurationForQCL, the UE 205 may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE 205. In this case, if the 'QCL-TypeD' of the PDSCH DM-RS is different from that of the PDCCH DM-RS with which they overlap in at least one symbol, the UE 205 is expected to prioritize the reception of PDCCH associated with that CORESET. This also applies to the intra-band CA case (when PDSCH and the CORESET are in different component carriers).

If none of configured TCI states for the serving cell of scheduled PDSCH contains 'QCL-TypeD', the UE 205 is to obtain the other QCL assumptions from the indicated TCI states for its scheduled PDSCH irrespective of the time offset between the reception of the DL DCI and the corresponding PDSCH. If a UE 205 configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE 205 may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE 205.

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE 205 may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

For a periodic CSI-RS resource in an non-zero-power CSI-RS resource set ("NZP-CSI-RS-ResourceSet") configured with higher layer parameter trs-Info, the UE 205 is to expect that a TCI-State indicates one of the following quasi co-location type(s):
- 'QCL-TypeC' with an SS/PBCH block and, when applicable, 'QCL-TypeD' with the same SS/PBCH block, or
- 'QCL-TypeC' with an SS/PBCH block and, when applicable, 'QCL-TypeD' with a CSI-RS resource in an NZP-CSI-RS-ResourceSet configured with higher layer parameter repetition, or For an aperiodic CSI-RS resource in an NZP-CSI-RS-ResourceSet configured with higher layer parameter trs-Info, the UE 205 is to expect that a TCI-State indicates 'QCL-TypeA' with a periodic CSI-RS resource in an NZP-CSI-RS-ResourceSet configured with higher layer parameter trs-Info and, when applicable, 'QCL-TypeD' with the same periodic CSI-RS resource.

For a CSI-RS resource in an NZP-CSI-RS-ResourceSet configured without higher layer parameter trs-Info and without the higher layer parameter repetition, the UE 205 is to expect that a TCI-State indicates one of the following quasi co-location type(s):
- 'QCL-TypeA' with a CSI-RS resource in an NZP-CSI-RS-ResourceSet configured with higher layer parameter trs-Info and, when applicable, 'QCL-TypeD' with the same CSI-RS resource, or
- 'QCL-TypeA' with a CSI-RS resource in an NZP-CSI-RS-ResourceSet configured with higher layer parameter trs-Info and, when applicable, 'QCL-TypeD' with an SS/PBCH block, or
- 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
- 'QCL-TypeB' with a CSI-RS resource in an NZP-CSI-RS-ResourceSet configured with higher layer parameter trs-Info when 'QCL-TypeD' is not applicable.

For a CSI-RS resource in an NZP-CSI-RS-ResourceSet configured with higher layer parameter repetition, the UE 205 is to expect that a TCI-State indicates one of the following quasi co-location type(s):
- 'QCL-TypeA' with a CSI-RS resource in an NZP-CSI-RS-ResourceSet configured with higher layer parameter trs-Info and, when applicable, 'QCL-TypeD' with the same CSI-RS resource, or
- 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
- 'QCL-TypeC' with an SS/PBCH block and, when applicable, 'QCL-TypeD' with the same SS/PBCH block.

For the DM-RS of PDCCH, the UE 205 is to expect that a TCI-State indicates one of the following quasi co-location type(s):
- 'QCL-TypeA' with a CSI-RS resource in an NZP-CSI-RS-ResourceSet configured with higher layer parameter trs-Info and, when applicable, QCL-TypeD' with the same CSI-RS resource, or 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in an NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE 205 is to expect that a TCI-State indicates one of the following quasi co-location type(s):

'QCL-TypeA' with a CSI-RS resource in an NZP-CSI-RS-ResourceSet configured with higher layer parameter trs-Info and, when applicable, QCL-TypeD' with the same CSI-RS resource, or 'QCL-TypeA' with a CSI-RS resource in an NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or QCL-TypeA' with a CSI-RS resource in an NZP-CSI-RS-ResourceSet configured without higher layer parameter trs-Info and without higher layer parameter repetition and, when applicable, 'QCL-TypeD' with the same CSI-RS resource.

Figure 5:
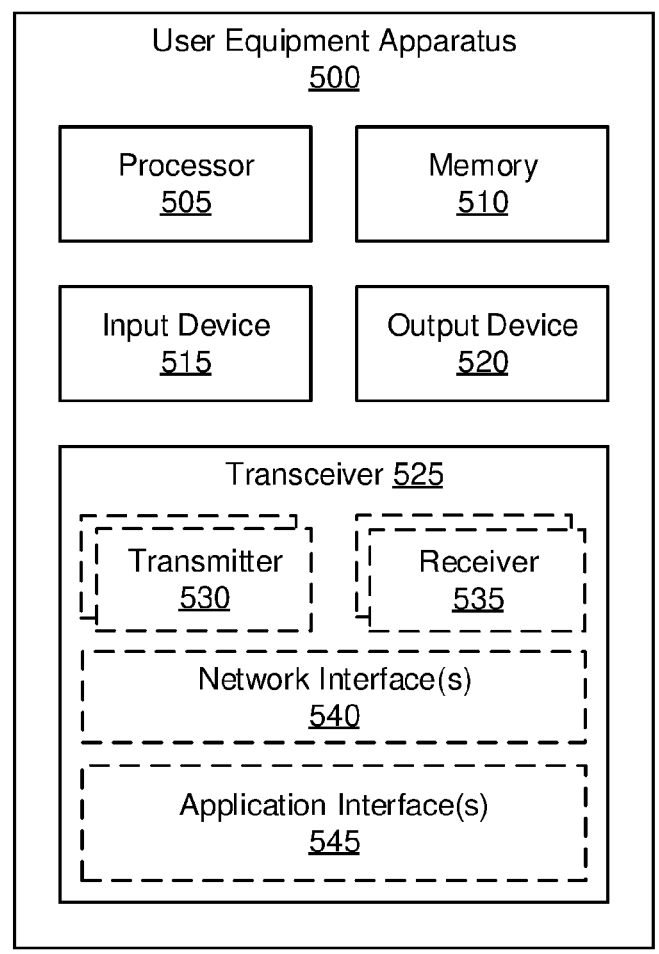
FIG. 5 is a diagram illustrating one embodiment of a user equipment apparatus that may be used for beam switching after LBT procedure.

FIG. 5 depicts a user equipment apparatus 500 that may be used for beam switching after LBT procedure, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panel supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 controls the user equipment apparatus 500 to implement the above described UE behaviors. For example, the processor 505 may perform a LBT procedure at a first UE panel prior to a first occasion of CG resources. The processor 505 performs UL transmission of a first TB during the first occasion and using the first UE panel in response to successful LBT. In some embodiments, the UL transmission during the first occasion is accompanied by uplink control information ("UCI") identifying the UE panel used for transmission on the CG resource. Note that while the user equipment apparatus is described in terms of performing a LBT procedure for a "set of UE panels," in other embodiments LBT may be performed for a "set of beams." As used herein, the term "panel/beam" (or similar notation) indicates that the description applies to a UE panel and/or beam.

In some embodiments, performing the LBT procedure comprises performing a clear channel assessment for a plurality of sensing UE panels. In such embodiments, performing the UL transmission of the first TB further comprises transmitting the first TB using at least one additional TX UE panel from the plurality of sensing UE panels for which LBT is successful, where each TX UE panel is associated with different CG resources.

In some embodiments, performing the UL transmission of the first TB during the first occasion includes selecting a single one of the plurality of TX UE panels and transmitting the first TB using the selected TX UE panel. In certain embodiments, the single one of the plurality of TX UE panels is selected based on a lowest energy detection value from the clear channel assessments of the sensing UE panel. In such embodiments, a QCL type-D relationship exists between the plurality of sensing UE panels and the plurality of TX UE panels.

The processor 505 and starts a timer in response to the UL transmission. In some embodiments, the timer comprises either a CG retransmission timer or a panel failure timer that is different from the CG retransmission timer. In certain embodiments, the panel failure timer is associated with a certain channel access priority class. In some embodiments, the value of the timer corresponds to a channel access priority class for the UL transmission.

In some embodiments, processor 505 determines failure of the UL transmission due to note receiving HARQ-ACK feedback within the duration of timer. In other embodiments, the processor 505 receives at least one HARQ-ACK feedback for the first TB and terminates the timer in response to the HARQ-ACK feedback. Here, the processor 505 further flushes a HARQ buffer associated with transmission of the first TB in response to receiving the HARQ-ACK feedback for the first TB. In certain embodiments, the processor further terminates retransmission of the first TB in response to receiving at least one HARQ-ACK feedback and flushes all HARQ buffers associated with transmission of the first TB.

The processor 505 switches to a second UE panel for subsequent UL transmission of the first TB in response to determining that failure of the UL transmission has occurred. In some embodiments, the UL transmission during the first occasion is associated with a first HARQ process. In such embodiments, performing UL transmission during the second occasion and using the second UE panel includes reusing the first HARQ process.

In some embodiments, the UE is configured with a multiple sensing UE panels. In such embodiments, the LBT procedure is performed using a first sensing UE panel, where switching to the second UE panel includes switching from the first sensing UE panel to a second sensing UE panel. In some embodiments, the UE is configured with a multiple TX UE panels. In such embodiments, the UL transmission of a first TB is performed for a first TX UE panel, where switching to the second UE panel includes switching from the first TX UE panel to a second TX UE panel.

In some embodiments, the second UE panel is associated with the same CG resources as the first UE panel. In such embodiments, the subsequent UL transmission is to performed using the same time-frequency resource as the first occasion of CG resources. In other embodiments, each TX UE panel is associated with different CG resources. In such embodiments, the subsequent UL transmission is performed using a different time-frequency resource than the first occasion of CG resources. In certain embodiments, performing the subsequent UL transmission comprises selecting a CG resource having a same TB size as the first occasion of CG resources.

In various embodiments, the user equipment apparatus 500 supports time domain multiplexing ("TDM") of DL/UL transmissions in different panels/beams in the same COT. Here, the processor 505 may perform LBT (i.e., directional or omni-directional LBT) at the beginning of COT. In certain embodiments, the processor 505 performs additional directional LBT with sensing panel/beam that covers the next TX panel/beam for each panel/beam switching in the middle of COT, as described herein. Note that when additional direction LBT is performed, the first LBT may cover all TDM panels/beams or may cover only the first TX panel/beam. In other embodiments, the processor 505 does not perform additional LBT before each panel/beam switching in the middle of COT where the sensing panel(s)/beam (s) for the (first) LBT procedure cover all TDM panels/beams.

In various embodiments, the processor 505 performs a first LBT procedure using omni-directional sensing to acquire a first COT. Via the transceiver 525, the processor 505 performs a first UL transmission of a first TB during the first COT and using a first TX panel/beam in response to successful LBT. Here, the first UL transmission uses a first portion of the first COT (i.e., does not use the entirety of the first COT). The processor 505 performs a directional LBT procedure for a second UE panel to acquire a remaining portion of the first COT.

In some embodiments, the processor 505 performs the first LBT procedure by using a category-4 ("Cat-4") LBT procedure to acquire the first COT (i.e., LBT with a random back-off and with a variable size contention window). In such embodiments, the processor 505 also performs the directional LBT procedure by using a category-2 ("Cat-2") LBT procedure (i.e., LBT without random back-off). In some embodiments, performing the first LBT procedure comprises concurrently performing directional LBT procedures on for all configured UE panels.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to beam switching after LBT procedure. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/ circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
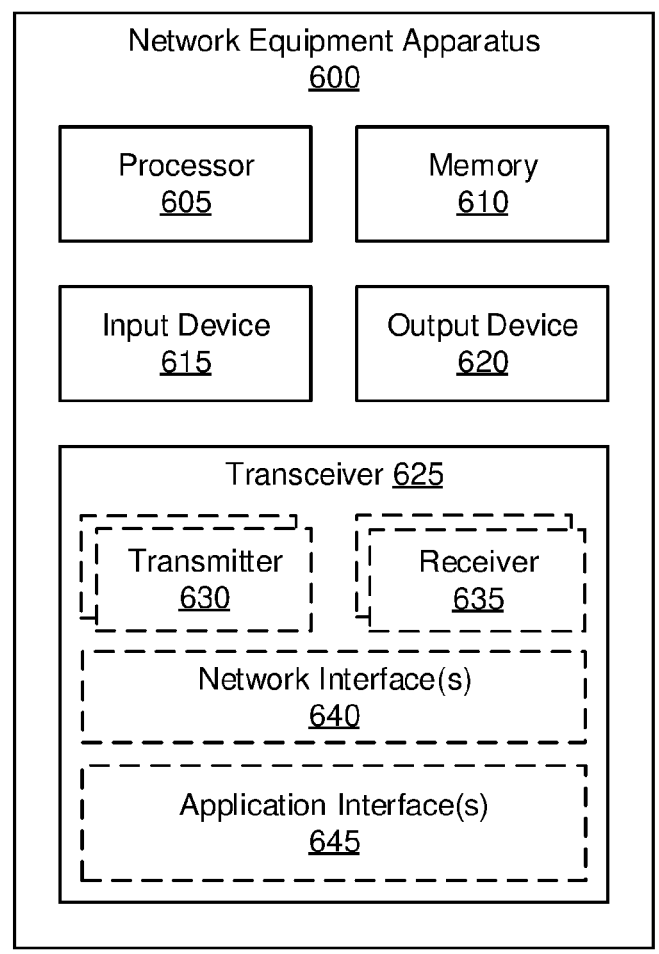
FIG. 6 is a diagram illustrating one embodiment of a network equipment apparatus that may be used for beam switching after LBT procedure.

FIG. 6 depicts a network equipment apparatus 600 that may be used for beam switching after LBT procedure, according to embodiments of the disclosure. In one embodiment, network equipment apparatus 600 may be one implementation of a RAN node, such as the base unit 121, the RAN node 210, or gNB, described above. Furthermore, the base network equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network equipment apparatus 600 may not include any input device 615 and/or output device 620. In various embodiments, the network equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network equipment apparatus 600 is a RAN node (e.g., gNB) that sends UE configurations and receives measurement reports, as described herein. In such embodiments, the processor 605 controls the network equipment apparatus 600 to perform the above described behaviors. When operating as a RAN node, the processor 605 may include an application processor (also known as "main processor") which manages application-domain and operating system ("OS") functions and a baseband processor (also known as "baseband radio processor") which manages radio functions.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to beam switching after LBT procedure. For example, the memory 610 may store parameters, configurations, resource assignments, policies, and the like, as described above. In certain embodiments, the memory 610 also stores program code and related data, such as an operating system or other controller algorithms operating on the remote unit 65.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network equipment apparatus 600 may have any suitable number of transmitters 630 and receivers 635. Further, the transmitter(s) 630 and the receiver(s) 635 may be any suitable type of transmitters and receivers.

Figure 7:
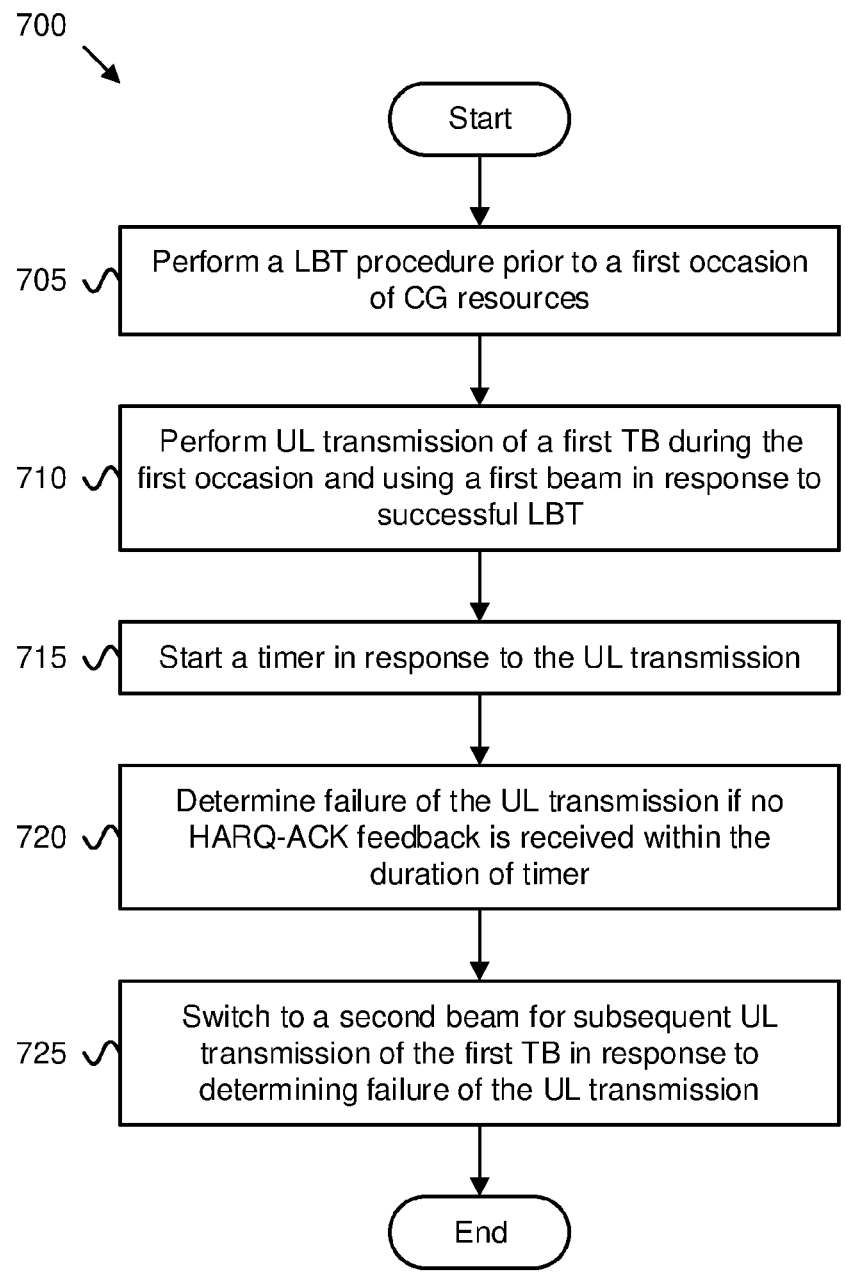
FIG. 7 is a flowchart diagram illustrating one embodiment of a first method for beam switching after LBT procedure.

FIG. 7 depicts one embodiment of a method 700 for beam switching after LBT procedure, according to embodiments of the disclosure. In various embodiments, the method 700 is performed by a UE, such as the remote unit 105, the UE 205 and/or the user equipment apparatus 800, described above. In some embodiments, the method 700 is performed by a processor, such as a microcontroller, a microprocessor, a CPU, a GPU, an auxiliary processing unit, a FPGA, or the like.

The method 700 begins and performs 705 a Listen-Before-Talk ("LBT") procedure prior to a first occasion of configured-grant ("CG") resources. The method 700 includes performing 710 uplink ("UL") transmission of a first transport block ("TB") during the first occasion and using a first beam in response to successful LBT. The method 700 includes starting 715 a timer in response to the UL transmission. The method 700 includes determining 720 failure of the UL transmission if no HARQ-ACK feedback is received within the duration of timer. The method 700 includes switching 725 to a second beam for subsequent UL transmission of the first TB in response to determining failure of the UL transmission. The method 700 ends.

Figure 8:
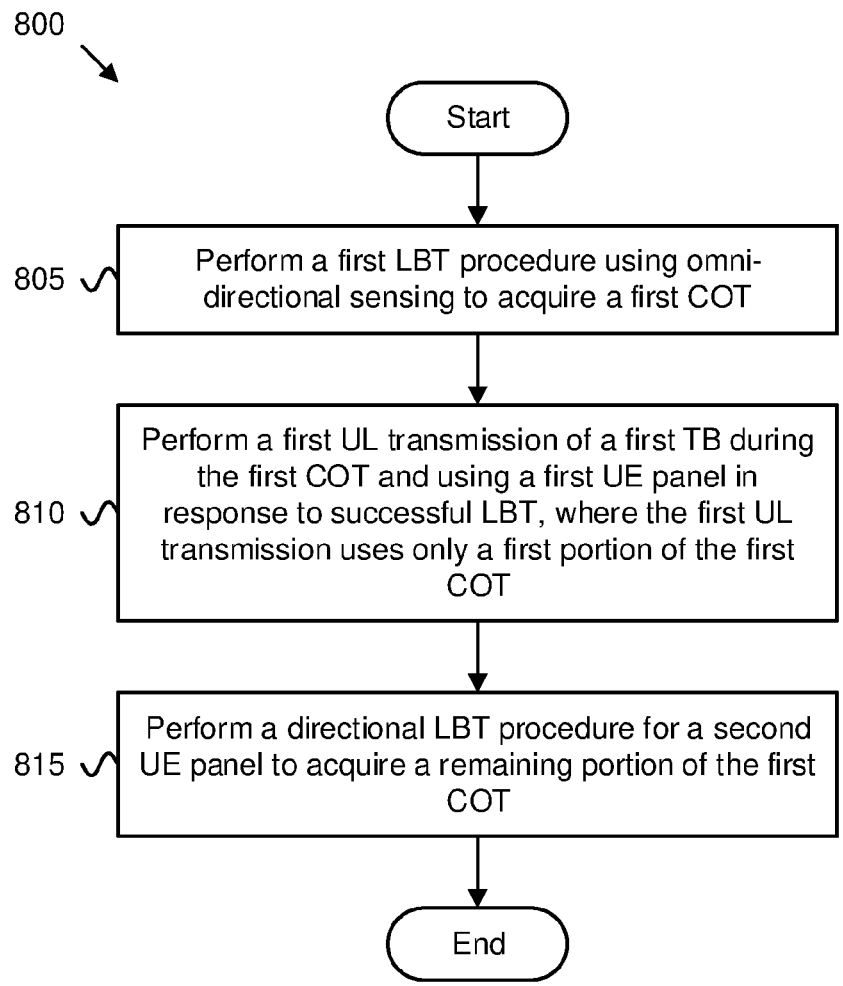
FIG. 8 is a flowchart diagram illustrating one embodiment of a second method for beam switching after LBT procedure.

FIG. 8 depicts one embodiment of a method 800 for beam switching after LBT procedure, according to embodiments of the disclosure. In various embodiments, the method 800 is performed by a UE, such as the remote unit 105, the UE 205 and/or the user equipment apparatus 800, described above. In some embodiments, the method 800 is performed by a processor, such as a microcontroller, a microprocessor, a CPU, a GPU, an auxiliary processing unit, a FPGA, or the like.

The method 800 begins and performs 805 a first LBT procedure using omni-directional sensing to acquire a first COT. The method 800 includes performing 810 a first UL transmission of a first TB during the first COT and using a first beam in response to successful LBT. Here, the first UL transmission uses only a first portion of the first COT. The method 800 includes performing 815 a directional LBT procedure for a second beam to acquire a remaining portion of the first COT. The method 800 ends.

Disclosed herein is a first apparatus for beam switching after LBT procedure, according to embodiments of the disclosure. The first apparatus may be implemented by a UE, such as the remote unit 105, the UE 205 and/or the user equipment apparatus 800, described above. The first apparatus includes a processor and a transceiver operable on unlicensed spectrum, where the transceiver supports a plurality of UE panels. The processor performs a LBT procedure at a first UE panel prior to a first occasion of CG resources. The processor performs UL transmission of a first TB during the first occasion and using the first UE panel in response to successful LBT and starts a timer in response to the UL transmission. The processor determines that failure of the UL transmission has occurred in response to not receiving any HARQ-ACK feedback within the duration of timer and switches to a second UE panel for subsequent UL transmission of the first TB in response to determining that failure of the UL transmission has occurred. Note that while the first apparatus is described in terms of performing a LBT procedure and transmission for a set of "UE panels," in other embodiments the LBT procedure and transmission may be performed for a set of "beams."

In some embodiments, the UE is configured with a multiple sensing UE panels. In such embodiments, the LBT procedure is performed using a first sensing UE panel, where switching to the second UE panel includes switching from the first sensing UE panel to a second sensing UE panel. In some embodiments, the UE is configured with a multiple TX UE panels. In such embodiments, the UL transmission of a first TB is performed for a first TX UE panel, where switching to the second UE panel includes switching from the first TX UE panel to a second TX UE panel.

In some embodiments, the second UE panel is associated with the same CG resources as the first UE panel. In such embodiments, the subsequent UL transmission is performed using the same time-frequency resource as the first occasion of CG resources. In other embodiments, each TX UE panel is associated with different CG resources. In such embodiments, the subsequent UL transmission is performed using a different time-frequency resource than the first occasion of CG resources. In certain embodiments, performing the subsequent UL transmission includes selecting a CG resource having a same TB size as the first occasion of CG resources.

In some embodiments, the timer comprises either a CG retransmission timer or a panel failure timer that is different from the CG retransmission timer. In certain embodiments, the panel failure timer is associated with a certain channel access priority class. In some embodiments, the UL transmission during the first occasion is associated with a first HARQ process. In such embodiments, performing UL transmission during the second occasion and using the second UE panel includes reusing the first HARQ process.

In some embodiments, performing the LBT procedure includes performing a clear channel assessment for a plurality of sensing UE panels. In such embodiments, performing the UL transmission of the first TB during the first occasion includes selecting a single one of the plurality of TX UE panels and transmitting the first TB using the selected TX UE panel. In certain embodiments, the single one of the plurality of TX UE panels is selected based on a lowest energy detection value from the clear channel assessments of the sensing UE panel. In such embodiments, a QCL type-D relationship exists between the plurality of sensing UE panels and the plurality of TX UE panels.

In some embodiments, performing the LBT procedure includes performing a clear channel assessment for a plurality of sensing UE panels. In such embodiments, performing the UL transmission of the first TB further includes transmitting the first TB using at least one additional TX UE panel from the plurality of sensing UE panels for which LBT is successful, where each TX UE panel is associated with different CG resources. In certain embodiments, the processor further terminates retransmission of the first TB in response to receiving at least one HARQ-ACK feedback and flushes all HARQ buffers associated with transmission of the first TB.

In some embodiments, the UL transmission during the first occasion is accompanied by UCI identifying the UE panel used for transmission on the CG resource. In some embodiments, the value of the timer corresponds to a channel access priority class for the UL transmission. In some embodiments, the processor further terminates the timer in response to receiving at least one HARQ-ACK feedback for the first TB and flushes a HARQ buffer associated with transmission of the first TB in response to receiving the HARQ-ACK feedback for the first TB.

Disclosed herein is a first method for beam switching after LBT procedure, according to embodiments of the disclosure. The first method may be performed by a UE, such as the remote unit 105, the UE 205 and/or the user equipment apparatus 800, described above. The first method includes receiving a first message containing a first indication of an access mode of a UE, where the UE is connected to a non-public radio cell, and transmitting a second message specifying at least one measurement configuration from the RAN node to the UE. The first method includes performing a LBT procedure prior to a first occasion of CG resources and performing UL transmission of a first TB during the first occasion and using a first beam in response to successful LBT. The first method includes starting a timer in response to the UL transmission, determining that failure of the UL transmission has occurred in response to not receiving any HARQ-ACK feedback within the duration of timer, and switching to a second beam for subsequent UL transmission of the first TB in response to determining that failure of the UL transmission has occurred. Note that while the first method is described in terms of performing a LBT procedure and transmission for a set of "beams," in other embodiments the LBT procedure and transmission may be performed for a set of "UE panel."

In some embodiments, the UE is configured with a multiple sensing beams. In such embodiments, the LBT procedure is performed using a first sensing beam, where switching to the second beam includes switching from the first sensing beam to a second sensing beam. In some embodiments, the UE is configured with a multiple TX beams. In such embodiments, the UL transmission of a first TB is performed for a first TX beam, where switching to the second beam includes switching from the first TX beam to a second TX beam.

In some embodiments, the second beam is associated with the same CG resources as the first beam. In such embodiments, the subsequent UL transmission is performed using the same time-frequency resource as the first occasion of CG resources. In other embodiments, each TX beam is associated with different CG resources. In such embodiments, the subsequent UL transmission is performed using a different time-frequency resource than the first occasion of CG resources. In certain embodiments, performing the subsequent UL transmission includes selecting a CG resource having a same TB size as the first occasion of CG resources.

In some embodiments, the timer comprises either a CG retransmission timer or a beam failure timer that is different from the CG retransmission timer. In certain embodiments, the beam failure timer is associated with a certain channel access priority class. In some embodiments, the UL transmission during the first occasion is associated with a first HARQ process. In such embodiments, performing UL transmission during the second occasion and using the second beam comprises reusing the first HARQ process.

In some embodiments, performing the LBT procedure includes performing a clear channel assessment for a plurality of sensing beams. In such embodiments, performing the UL transmission of the first TB during the first occasion includes selecting a single one of the plurality of TX beams and transmitting the first TB using the selected TX beam. In certain embodiments, the single one of the plurality of TX beams is selected based on a lowest energy detection value from the clear channel assessments of the sensing beam. In such embodiments, a QCL type-D relationship exists between the plurality of sensing beams and the plurality of TX beams.

In some embodiments, performing the LBT procedure includes performing a clear channel assessment for a plurality of sensing beams, wherein performing the UL transmission of the first TB further includes transmitting the first TB using at least one additional TX beam from the plurality of sensing beams for which LBT is successful, where each TX beam is associated with different CG resources. In certain embodiments, the first method further includes terminating retransmission of the first TB in response to receiving at least one HARQ-ACK feedback and flushing all HARQ buffers associated with transmission of the first TB.

In some embodiments, the UL transmission during the first occasion is accompanied by UCI, the UCI identifying the beam used for transmission on the CG resource. In some embodiments, the value of the timer corresponds to a channel access priority class for the UL transmission. In some embodiments, the first method further includes terminating the timer in response to receiving at least one HARQ-ACK feedback for the first TB and flushing a HARQ buffer associated with transmission of the first TB in response to receiving the HARQ-ACK feedback for the first TB.

Disclosed herein is a second apparatus for beam switching after LBT procedure, according to embodiments of the disclosure. The second apparatus may be implemented by a UE, such as the remote unit 105, the UE 205 and/or the user equipment apparatus 800, described above. The second apparatus includes a processor and a transceiver that is operable on unlicensed spectrum, wherein the transceiver supports a plurality of UE panels. The processor performs a first LBT procedure using omni-directional sensing to acquire a first COT and performs a first UL transmission of a first TB during the first COT and using a first UE panel in response to successful LBT. Here, the first UL transmission uses a first portion of the first COT [i.e., does not use the entirety of the first COT]. The processor performs a directional LBT procedure for a second UE panel to acquire a remaining portion of the first COT. Note that while the second apparatus is described in terms of performing a LBT procedure and transmission for a set of "UE panels," in other embodiments the LBT procedure and transmission may be performed for a set of "beams."

In some embodiments, performing the first LBT procedure comprises using a category-4 ("Cat-4") LBT procedure to acquire the first COT, wherein performing the directional LBT procedure comprises using a category-2 ("Cat-2") LBT procedure. In some embodiments, performing the first LBT procedure comprises concurrently performing directional LBT procedures on for all configured UE panels.

Disclosed herein is a second method for beam switching after LBT procedure, according to embodiments of the disclosure. The second method may be performed by a UE, such as the remote unit 105, the UE 205 and/or the user equipment apparatus 800, described above. The second method includes performing a first LBT procedure using omni-directional sensing to acquire a first COT and performing a first UL transmission of a first TB during the first COT and using a first beam in response to successful LBT, wherein the first UL transmission uses a first portion of the first COT [i.e., does not use the entirety of the first COT]. The second method includes performing a directional LBT procedure for a second beam to acquire a remaining portion of the first COT. Note that while the second method is described in terms of performing a LBT procedure and transmission for a set of "beams," in other embodiments the LBT procedure and transmission may be performed for a set of "UE panels."

In some embodiments, performing the first LBT procedure comprises using a category-4 ("Cat-4") LBT procedure to acquire the first COT, wherein performing the directional LBT procedure comprises using a category-2 ("Cat-2") LBT procedure. In some embodiments, performing the first LBT procedure comprises concurrently performing directional LBT procedures on for all configured beams.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a User Equipment ("UE"), the method comprising:
   performing a Listen-Before-Talk ("LBT") procedure prior to a first occasion of configured-grant ("CG") resources, wherein the LBT procedure comprises performing a clear channel assessment for a plurality of beams;
   selecting a first beam of the plurality of beams, wherein the first beam has a lowest energy detection value that is determined based on the clear channel assessment;
   performing an uplink ("UL") transmission of a first transport block ("TB") during the first occasion and using the first beam in response to the performed LBT procedure;
   determining that no hybrid automatic repeat request acknowledgment ("HARQ-ACK") feedback is received within a duration of a timer; and
   switching to a second beam of the plurality of beams for one or more subsequent UL transmissions of the first TB in response to the determining.

2. The method of claim 1, wherein the plurality of beams comprises multiple sensing beams, wherein the LBT procedure is performed using at least a first sensing beam, and wherein switching to the second beam comprises switching from the first sensing beam to a second sensing beam.

3. The method of claim 2, wherein the selected first beam is associated with more than one sensing beam.

4. The method of claim 1, wherein the plurality of beams comprises multiple transmit beams, wherein switching to the second beam comprises switching from the first beam to a second transmit beam.

5. The method of claim 1, wherein the timer comprises one of a CG retransmission timer and a beam failure timer.

6. The method of claim 5, wherein the beam failure timer is associated with a channel access priority class.

7. The method of claim 1, further comprising performing the one or more subsequent UL transmissions during a second occasion of the CG resources and using the second beam, wherein the UL transmission of the TB during the first occasion is associated with a first hybrid automatic repeat request ("HARQ") process, and wherein the one or more subsequent UL transmissions reuse the first HARQ process.

8. The method of claim 1, wherein the plurality of beams comprises multiple sensing beams and multiple transmit beam, and wherein a quasi-co location (QCL) type-D relationship exists between a respective sensing beam and a corresponding transmit beam.

9. The method of claim 1, further comprising:
   terminating a retransmission of the first TB in response to receiving at least one HARQ-ACK feedback; and
   flushing all hybrid automatic repeat request ("HARQ") buffers associated with transmission of the first TB.

10. The method of claim 1, further comprising transmitting first uplink control information ("UCI") with the UL transmission during the first occasion, the first UCI identifying the selected first beam.

11. The method of claim 1, wherein a value of the timer corresponds to a channel access priority class for the UL transmission.

12. The method of claim 1, further comprising:
   terminating the timer in response to receiving at least one HARQ-ACK feedback for the first TB; and
   flushing a hybrid automatic repeat request ("HARQ") buffer associated with transmission of the first TB in response to receiving the HARQ-ACK feedback.

13. A User Equipment ("UE") for wireless communication, comprising:
   a transceiver operable on unlicensed spectrum, wherein the transceiver comprises a plurality of UE panels;
   at least one memory; and
   at least one processor coupled with the at least one memory and configured to cause the UE to:
   perform a Listen-Before-Talk ("LBT") procedure prior to a first occasion of configured-grant ("CG") resources, wherein the LBT procedure comprises performing a clear channel assessment for a plurality of beams;
   select a first UE panel of the plurality of UE panels, wherein the first UE panel corresponds to a lowest energy detection value that is determined based on the clear channel assessment;
   perform an uplink ("UL") transmission of a first transport block ("TB") during the first occasion and via the first UE panel in response to the performed LBT procedure;
   determine that no hybrid automatic repeat request acknowledgment ("HARQ-ACK") feedback is received within a duration of a timer; and
   switch to a second UE panel of the plurality of UE panels for one or more subsequent UL transmissions of the first TB in response to the determining.

14. The UE of claim 13, wherein the at least one processor is configured to cause the UE to:
receive a configuration for multiple sensing beams, each sensing beam associated with a UE panel of the plurality of UE panels;
perform the LBT procedure using at least a first sensing beam associated with the first UE panel; and
switch from the first sensing beam to a second sensing beam associated with the second UE panel in response to a failure of the UL transmission.

15. The UE of claim 13, wherein the at least one processor is configured to cause the UE to:
receive a configuration for multiple beams, each beam associated with a UE panel of the plurality of UE panels, wherein the UL transmission of the first TB is performed using a first beam associated with the first UE panel; and
switch from the first beam to a second beam associated with the second UE panel in response to a failure of the UL transmission.

16. The UE of claim 13, wherein the timer comprises one of a CG retransmission timer and a beam failure timer.

17. The UE of claim 13, wherein a value of the timer is associated with a channel access priority class for the UL transmission.

18. The UE of claim 13, wherein the at least one processor is configured to cause the UE to perform the one or more subsequent UL transmissions during a second occasion of the CG resources and using the second beam, wherein the UL transmission during the first occasion is associated with a first hybrid automatic repeat request ("HARQ") process, and wherein the one or more subsequent UL transmissions reuse the first HARQ process.

19. The UE of claim 13, wherein plurality of beams comprises multiple sensing beams and multiple transmit beam, and wherein a quasi-co location (QCL) type-D relationship exists between a respective sensing beam and a corresponding transmit beam.

20. The UE of claim 13, wherein the at least one processor is configured to cause the UE to transmit first uplink control information ("UCI") with the UL transmission during the first occasion, the first UCI identifying the selected first beam.

* * * * *